3,308,085
PROCESS FOR CONTROLLING THE PEPTISATION OF SULPHUR MODIFIED POLYCHLOROPRENE LATEX
Anthony Archibald Sparks, Epsom Downs, and Robert Charles Moore, Sutton, England, assignors to The Distillers Company Limited, Edinburgh, Scotland, a British company
No Drawing. Filed June 2, 1964, Ser. No. 372,077
5 Claims. (Cl. 260—29.7)

The present invention relates to the production of polychloroprene and in particular to a process for retarding the peptisation of sulphur modified polychloroprene latex.

By the term sulphur modified polychloroprene latex is meant throughout this specification any latex formed by polymerising 2-chloro-1,3-butadiene, or 2-chloro-1,3-butadiene and a copolymerisable monomer or monomers in the presence of sulphur and/or compounds containing sulphur. By the term peptisation is meant throughout this specification the breakdown or partial breakdown of the sulphur modified polychloroprene to give a more plastic product.

Processes for the peptisation of sulphur modified polychloroprene latex by the addition of a tetra-alkyl thiuram disulphide and a dialkyl dithiocarbamate are known. Copending U.S. application Number 263,713, now Patent No. 3,235,527 issued February 15, 1966, describes the use as peptising agents of tetra ethyl thiuram disulphide in combination with a di-alkyl ammonium dialkyl dithiocarbamate and in particular with dimethyl ammonium dimethyl dithiocarbamate or diethyl ammonium diethyl dithiocarbamate.

Accordingly the present invention is a process for retarding or stopping peptisation of sulphur modified polychloroprene latex which comprises peptising a sulphur modified polychloroprene latex with a tetra lower alkyl thiuram disulphide and a dialkyl dithiocarbamate adding a persulphate salt and adjusting the pH of the latex to at least 10.5 where it is less than this figure either before or after addition of the persulphate salt.

By lower alkyl group is meant throughout this specification an alkyl group containing from 1 to 6 carbon atoms.

The preferred persulphates are the ammonium or alkali metal salts. The amount of persulphate salt can vary widely but it is undesirable to add quantities which result in the presence of a large excess of persulphate in the polychloroprene rubber finally produced. The optimum quantity of persulphate salt required is related to the amount of dialkyl dithiocarbamate present in the latex. It is thought that the persulphate controls the peptisation of the latex by oxidizing the dithiocarbamate present to thiuram. It is preferred to add the minimum quantity of persulphate salt required to oxidise completely the dithiocarbamate to thiuram. Thiuram as used herein refers to thiuram disulphides. This is the accepted definition as evidenced by the Condensed Chemical Dictionary, 6th edition, by Arthur and Elizabeth Rose (Reinhold Publishing Corporation, 1961).

The preferred dialkyl dithiocarbamates are compounds having the general formula:

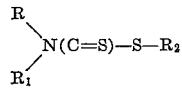

where R and $R_1$ represent alkyl groups containing from 1 to 6 carbon atoms, $R_2$ represents hydrogen, a metal of the alkali or alkaline earth groups, an ammonium radical or substituted ammonium radical. Some examples of these preferred dialkyl dithiocrabamates are dimethyl ammonium dimethyl dithiocarbamate, diethyl ammonium diethyl dithiocarbamate, and sodium dimethyl dithiocarbamate.

The process can be applied to a sulphur modified polychloroprene latex which has been peptised by a tetra lower alkyl thiuram disulphide and an alkali such as sodium hydroxide, where it is thought that the peptisation is brought about by dithiocarbamate formed from the reaction of these compounds.

It is necessary to adjust the pH of the latex to at least 10.5 where it is less than this figure; the adjustment can be made either before or after the persulphate salt is added. It is preferred to adjust the pH immediately after addition of the persulphate salt. Alkalis such as, for example, a dilute solution of caustic soda are suitable for this purpose.

The process can be carried out at widely different temperatures. A suitable temperature range is from ambient to 50° C.

The peptisation of sulphur modified polychloroprene latex by the tetra lower alkyl thiuram disulphide and a dialkyl dithiocarbamate can be retarded or stopped at any desired stage by the addition of the persulphate salt and adjustment of pH to 10.5 in accordance with the process of the present invention, thus providing a method for controlling such peptisation.

The present invention is further illustrated by the following examples in which the parts are by weight.

EXAMPLE

A curable sulphur modified polychloroprene latex of pH 11.0 was prepared using well known emulsion polymerisation procedures in which a minor proportion of sulphur was present in the emulsion and potassium persulphate used as the polymerisation initiator. The polymerisation was short stopped at an 85% conversion by the addition of a small amount of dimethyl ammonium dimethyl dithiocarbamate. A peptising mixture of tetraethyl thiuram disulphide and dimethyl ammonium dimethyl dithiocarbamate was then added to the latex to give a concentration based on the weight of chloroprene monomer charged of 1.6% tetraethyl thiuram disulphide and 0.25% dimethyl ammonium dimethyl dithiocarbamate. The latex was peptised at 40° C. until the Mooney viscosity (on massed rubber at 100° C.) of a sample of dry rubber was 45. The required amount of a 5% solution of ammonium persulphate based on the total weight of dithiocarbamates present was then added and the pH of the latex was immediately adjusted to 11.0 by addition of sodium hydroxide. The effect on the Mooney viscosity of the dry rubber formed from the latex is recorded in the table. By way of comparison the Mooney viscosity of dry rubber formed where no persulphate and no pH adjustment had been made are also given in the table.

|  | Peptising mixture | | Persulphate salt added after a Mooney viscosity of 45 had been reached | Amount, percent on monomer | Mooney viscosity on prolonged peptisation, Time (hours)[1] | | | |
| --- | --- | --- | --- | --- | --- | --- | --- | --- |
|  | Tetraethyl thiuram disulphide, percent on monomer | Dimethyl ammonium dithio-carbamate, percent on monomer |  |  | (2) | (5) | (7) | (25) |
| Comparative example | 1.6 | 0.25 | None | None | 40 | 35 | 33 | 26 |
| Example | 1.6 | 0.25 | Ammonium persulphate | 0.8 | 45 | 45 | 45 | 43 |

[1] Time in hours from the point where a Mooney viscosity of 45 had been reached.

We claim:

1. A process for retarding peptisation of sulphur modified polychloroprene latex which comprises peptising a sulphur modified polychloroprene latex with a tetra lower alkyl thiuram disulphide and a dialkyl dithiocarbamate, adding a persulphate salt in an amount sufficient to oxidize the dithiocarbamate to thiuram and maintaining the pH of the latex at at least 10.5.

2. A process as claimed in claim 1 wherein the persulphate salt is an ammonium or alkali metal salt.

3. A process as claimed in claim 1 wherein the pH of the latex is adjusted immediately after addition of the persulphate salt.

4. A process as claimed in claim 1 wherein the dialkyl dithiocarbamate is dimethyl ammonium dimethyl dithiocarbamate.

5. A process for retarding peptisation of sulphur modified polychloroprene latex which comprises peptising a sulphur modified polychloroprene latex with a tetra lower alkyl thiuram disulphide and a dialkyl dithiocarbamate at a temperature of from ambient to 40° C. adding an amount of a 5 percent solution of ammonium persulphate based on the total weight of dithiocarbamate present sufficient to oxidize it, and immediately adjusting the pH of the latex to about 11.0.

References Cited by the Examiner

UNITED STATES PATENTS 2,384,969   9/1945   Serniuk _____ 260—29.7
3,235,527   2/1966   Sparks _____ 260—29.7

MURRAY TILLMAN, Primary Examiner.

J. ZIEGLER, J. GOOLKASIAN, Assistant Examiners.